2,951,641
Patented Sept. 6, 1960

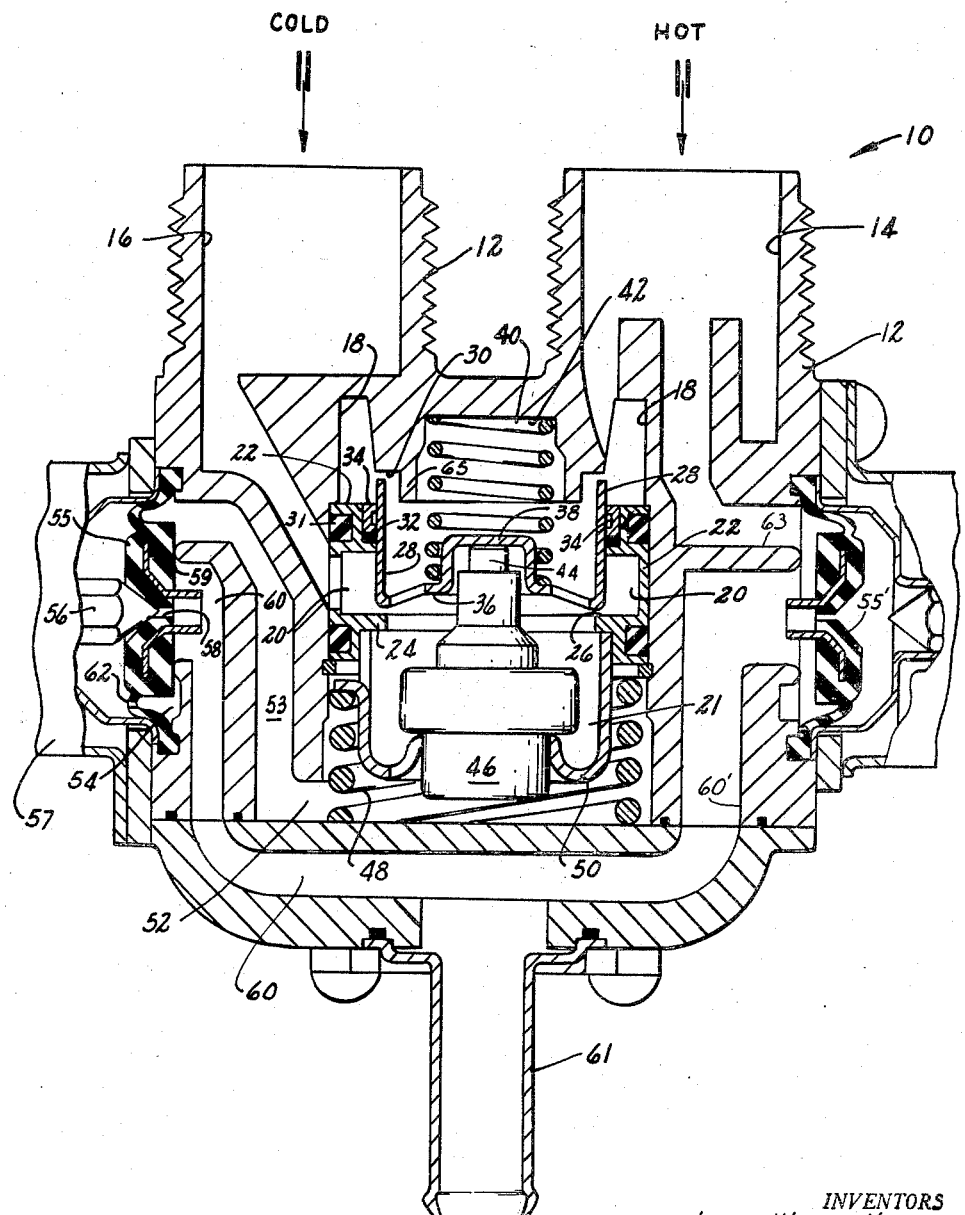

2,951,641

NOISELESS MIXING VALVE

Julius William Kovach and Sampson T. Noall, Jr., Detroit, and Thaddeus J. Cialek, Madison Heights, Mich., assignors to American Radiator & Standard Sanitary Corporation, New York, N.Y., a corporation of Delaware Filed June 19, 1957, Ser. No. 666,707

1 Claim. (Cl. 236—12)

This invention relates to a mixing valve construction and to means for eliminating "chatter" or "whistling" during valve operation. The "anti-whistling" valve of the invention may be used in the mixing of hot and cold water prior to entry thereof into the tub of an automatic clothes washing machine.

During operation of prior art mixing valves it has been discovered that certain of the valves tend to produce a high frequency audible noise or "whistle." Objects of the present invention are therefore to provide a mixing valve wherein:

(1) Whistle is eliminated,
(2) Elimination of the whistle is effected without materially increasing the cost of the valve, and
(3) Elimination of the whistle is accomplished in every valve, with no possibility that the whistle might occur in the event of parts tolerance variation or errors in workmanship.

Other objects of this invention will appear in the following description and appended claim, reference being had to the accompanying drawings forming a part of this specification wherein like reference characters designate corresponding parts in the several views.

The single figure in the drawings is a sectional view through one embodiment of the invention, with certain parts rearranged and modified to schematically illustrate the paths of fluid flow through the valve.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mixing valve 10 which includes a moulded nylon valve housing 12 having hot and cold inlet ports 14 and 16. Port 14 communicates with an annular hot fluid inlet chamber 18, and port 16 communicates with an annular cold fluid inlet chamber 20. Each of chambers 18 and 20 communicates with a mixing chamber 21.

Chamber 20 is formed by an annular brass insert 22 which includes an inwardly extending wall 24. Wall 24 defines an annular valve surface 26 which registers with one end of a tubular valve element 28. The other end of element 28 registers with an annular valve surface 30 formed at the outlet end of chamber 18. To isolate chambers 18 and 20 from each other annular rubber sealing rings are provided at 31 and 32. Ring 32 is retained in position by a brass retainer element 34.

Valve element 28 is provided with an apertured web 36 which includes a cup-shaped section 38. A compression spring 40 encircles section 38 and pressures against surface 42 of housing 12 so as to urge element 28 downwardly toward valve surface 26.

Downward movement of element 28 is opposed by a piston 44 which slidably extends from a conventional thermostatic power element casing 46. Casing 46 contains a body of wax or other "solid fill" thermal expansion material (not shown) whereby, when the temperature of fluid surrounding casing 46 is relatively high (e.g. 100° F.) the wax expands to force piston 44 upwardly out of casing 46 in such manner as to move tubular valve element 28 toward valve surface 30. As element 28 approaches surface 30 the flow of hot fluid from chamber 18 into the space surrounding casing 46 is automatically reduced and the flow of cold fluid from chamber 20 is automatically increased. As a result the temperature of fluid surrounding casing 46 is decreased so as to cause thermal contraction of the wax within casing 46. Contraction of the wax allows spring 40 to force element 28 toward surface 26 so as to increase the relative flow of hot fluid from chamber 18. In operation element 28 is moved back and forth so as to maintain a relatively constant mixed fluid temperature.

To prevent the possibility of parts damage in the event of excessively high mixed fluid temperatures the power element casing is seated on an apertured retainer element 50, which is floatably mounted by means of a strong compression spring 48. During normal operation casing 46 remains in its illustrated position, but in the event of excessively high mixed fluid temperatures element 28 pressures against surface 30, with spring 48 yielding to permit elements 46 and 50 to move downwardly so as to relieve the excess pressure.

During valve operation mixed temperature fluid flows out of chamber 21 through a port 52 into a passage 53 which leads to an annular chamber 54. Flow out of chamber 54 is controlled by a diaphragm 55, which is operated by a plunger 56 situated within a solenoid 57. When solenoid 57 is energized plunger 56 is drawn away from central opening 58 in the diaphragm so as to allow the pressure of fluid in chamber 54 to flex the diaphragm away from annular valve surface 59. As a result the chamber 54 fluid is enabled to flow past surface 59 into a passage 60. Eventually the fluid in passage 60 is discharged from valve 10 through a spigot 61. In practice spigot 61 is connected to a hose (not shown) which leads to the tub of a clothes washing machine.

When it is desired to halt the flow of mixed temperature fluid from chamber 54 solenoid 57 is deenergized. Spring means (not shown) is then free to urge plunger 56 to a position closing opening 58. Fluid in chamber 54 is thereby enabled to flow through bleed opening 62 so as to develop a fluid pressure on the left face of the diaphragm sufficient to force the diaphragm against valve surface 59 (as illustrated). With the diaphragm against valve surface 59 fluid flow from chamber 54 into passage 60 is halted.

The illustrated mixing valve is provided with passage means 63 for receiving hot fluid from inlet 14 (so as to bypass mixing chamber 21). Flow through passage 63 is controlled by a diaphragm 55' which operates in the same manner as previously mentioned diaphragm 55. When diaphragm 55' is open (as illustrated) fluid from passage 63 is free to flow into passage 60' and eventually to spigot 61.

Solenoids 57 and 57' may be operated to open their diaphragms 55 and 55', either together or separately. When diaphragm 55 is opened and diaphragm 55' is closed the fluid issuing from spigot 61 is at an intermediate temperature determined by power element 46. When diaphragm 55' is opened and diaphragm 55 is closed the fluid issuing from spigot 61 is at the temperature of the hot inlet fluid (with no flow through chamber 21). When both diaphragms are opened the fluid issuing from spigot 61 is at a temperature higher than that permitted by element 46 but lower than that of the hot inlet fluid (i.e. the hot fluid is mixed with the mixed temperature fluid at the spigot). When both diaphragms are closed there is no fluid flow out of the spigot.

It will be noted that an annular wall 65 projects axially from a point adjacent valve surface 30. Originally the valve was constructed without this annular wall, but it was found that when diaphragm 55 was opened the valve emitted an objectionable audible high frequency chatter or "whistle." It was determined that this whistling action was due to a high frequency oscillation of valve element 28; the whistle was evident when the valve was operating at high hot fluid inlet pressures and low cold fluid inlet pressures. Various attempts were made to eliminate the "whistle" effect achieved by these "oscillation-producing" unbalanced pressures. These attempts included such expedients as increasing the number and tightness of fit of rubber ring 32, grinding the ends of spring 40 to a precise flatness and providing a rubber boot or jacket between spring 40 and valve element 28. However, none of these attempts was found to be a practical deterrent to the undesired whistling action.

It was discovered that by providing annular wall 65 the objectionable whistle was avoided. The annular wall provides a "baffle" action which produces a more uniform flow pattern in chamber 21 in such manner as to effectively dampen the oscillating flow stream.

The added cost incident to moulding body 12 with annular wall 65 is comparatively small, and the "antiwhistling" effect is universal, i.e., it takes place in every valve irrespective of the precise fit of element 28 with respect to adjacent parts.

We claim:

A mixing valve comprising a valve housing internally contoured to define an annular hot fluid inlet chamber, an annular cold fluid inlet chamber in axial alignment with said hot fluid chamber, and a mixing chamber extending from within the central space defined by the inlet chambers to a point adjacent the cold fluid chamber and remote from the hot fluid chamber; an outlet opening for said mixing chamber located adjacent the end thereof remote from the hot fluid inlet chamber; wall means defining annular valve surfaces at the remote ends of said inlet chambers; a tubular valve element slidably extending between said valve surfaces and being of lesser axial length than the valve surface spacing so as to vary the flow from the two inlet chambers into the mixing chamber in accordance with its position of axial adjustment; thermostatic power means within the downstream end portion of the mixing chamber and connected with the tubular valve element to move said element axially so as to produce a substantially uniform mixed fluid temperature; and an annular wall extending substantially axially from the hot fluid chamber valve surface in spaced relation with the inner surface of the tubular valve element, whereby the hot fluid flowing from the hot fluid inlet chamber past the tubular valve element is baffled by the annular wall so as to substantially equalize the radial forces acting inwardly and outwardly on the portion of the valve element adjacent the hot fluid chamber valve surface for preventing noise-emitting radial oscillations of the tubular valve element.

References Cited in the file of this patent
UNITED STATES PATENTS

| | | |
|---|---|---|
| 2,558,962 | Kempton | July 3, 1951 |
| 2,657,860 | Schmidt et al. | Nov. 3, 1953 |
| 2,747,802 | Kmiecik | May 29, 1956 |